(12) United States Patent
Sundararajan et al.

(10) Patent No.: US 11,588,711 B2
(45) Date of Patent: Feb. 21, 2023

(54) INTENT-DRIVEN CLOUD BRANCHES

(71) Applicant: Cisco Technology, Inc., San Jose, CA (US)

(72) Inventors: Balaji Sundararajan, Fremont, CA (US); Ankush Verma, San Jose, CA (US); Bhavana Malhotra Bodas, Fremont, CA (US); Kaushik Pratap Biswas, San Jose, CA (US); Chandramouli Balasubramanian, Mountain View, CA (US); Anirudh Ramnath Ramakrishna, Santa Clara, CA (US); Madhuri Kolli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/120,896

(22) Filed: Dec. 14, 2020

(65) Prior Publication Data
US 2022/0052928 A1    Feb. 17, 2022

Related U.S. Application Data

(60) Provisional application No. 63/065,992, filed on Aug. 14, 2020.

(51) Int. Cl.
*H04L 41/5041* (2022.01)
*H04L 67/10* (2022.01)

(52) U.S. Cl.
CPC .......... *H04L 41/5041* (2013.01); *H04L 67/10* (2013.01)

(58) Field of Classification Search
CPC ............................ H04L 41/5041; H04L 67/10
See application file for complete search history.

(56) References Cited

U.S. PATENT DOCUMENTS 9,912,573 B1    3/2018  Zemlerub
10,469,317 B1   11/2019 Jiang et al.
(Continued)

FOREIGN PATENT DOCUMENTS

EP         3611619 A1    2/2020

OTHER PUBLICATIONS

"Cisco SD-WAN Cloudscale Architecture," CTI, Nov. 4, 2020, pp. 1-216.
(Continued)

*Primary Examiner* — Nicholas R Taylor
*Assistant Examiner* — Sanjoy K Roy
(74) *Attorney, Agent, or Firm* — Polsinelli

(57) ABSTRACT

Methods, systems, and non-transitory computer-readable media are provided for deploying intent-driving cloud branches. An example method can include obtaining, by one or more controllers in a software-defined network (SDN), a branch network design template for deploying a remote branch in the SDN, wherein the branch network design template defines networking settings for a plurality of services to be provisioned at the remote branch; obtaining, by the one or more controllers, a plurality of software packages for the plurality of services to be provisioned at the remote branch; and based on the branch network design template and the plurality of software packages, provisioning, by the one or more controllers, the plurality of services at the remote branch and a network connectivity of the plurality of services.

20 Claims, 9 Drawing Sheets

(56) References Cited

U.S. PATENT DOCUMENTS

| | | | | |
|---|---|---|---|---|
| 10,530,632 | B1* | 1/2020 | Mukhopadhyaya | ......................... H04L 41/5041 |
| 2014/0351424 | A1* | 11/2014 | Madani | ................... H04L 41/12 709/224 |
| 2016/0212017 | A1 | 7/2016 | Li et al. | |
| 2016/0232078 | A1* | 8/2016 | Biswas | ................... H04L 67/34 |
| 2017/0288971 | A1* | 10/2017 | Jayaraman | .......... H04L 41/5051 |
| 2017/0339247 | A1* | 11/2017 | Tiwari | ................ H04L 41/0895 |
| 2018/0314549 | A1* | 11/2018 | Chokkalingam | ... H04L 41/5051 |
| 2018/0317134 | A1* | 11/2018 | Leroux | ................. H04W 24/02 |
| 2019/0229987 | A1* | 7/2019 | Shelke | ................ G06F 9/45558 |
| 2020/0059420 | A1* | 2/2020 | Abraham | ............ H04L 41/5054 |
| 2020/0076683 | A1* | 3/2020 | Hegde | ................. H04L 41/0246 |

OTHER PUBLICATIONS

"Velocloud Administration Guide," VMware, Inc., Nov. 4, 2020, pp. 1-430.

International Search Report and Written Opinion from the International Searching Authority, dated Oct. 28, 2021, 11 pages, for corresponding International Patent Application No. PCT/US2021/044246.

"Network Functions Virtualisation (NFV); Ecosystem; Report on SDN Usage in NFV Architectural Framework," Sep. 1, 2017, pp. 1-125.

Paganelli, Federica, et al., "Network service description model for VNF orchestration leveraging Intent-based SDN Interfaces," Jul. 3, 2017, 5 pages.

\* cited by examiner

INTENT-DRIVEN CLOUD BRANCHES

CROSS-REFERENCE TO RELATED APPLICATIONS

This application claims priority to U.S. Provisional Patent Application No. 63/065,992, filed on Aug. 14, 2020, entitled "INTENT-DRIVEN CLOUD BRANCH", the contents of which are expressly incorporated herein in their entirety and for all purposes.

TECHNICAL FIELD

The subject matter of this disclosure relates in general to the field of computer networking, and more particularly, to systems, methods, and computer-readable media for enabling an intent-based remote branch of a software-defined network.

BACKGROUND

The enterprise network landscape is continuously evolving. There is a greater demand for mobile and Internet of Things (IoT) device traffic, Software-as-a-Service (SaaS) applications, and cloud adoption. In addition, network security needs and complexities are increasing and certain network applications and resources often rely on prioritization and optimization techniques for proper operation. As this complexity grows, there is a push to reduce costs and operating expenses while providing for high availability and scale.

Network architectures and technologies are facing major challenges under this evolving landscape. For example, networks generally experience a variety of complex issues such as, for example, insufficient bandwidth, high bandwidth costs, application downtime, poor service and application performance, complex operations, complex workflows for cloud connectivity, long deployment times and policy changes, limited application and resource visibility, and difficulty in securing the network.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
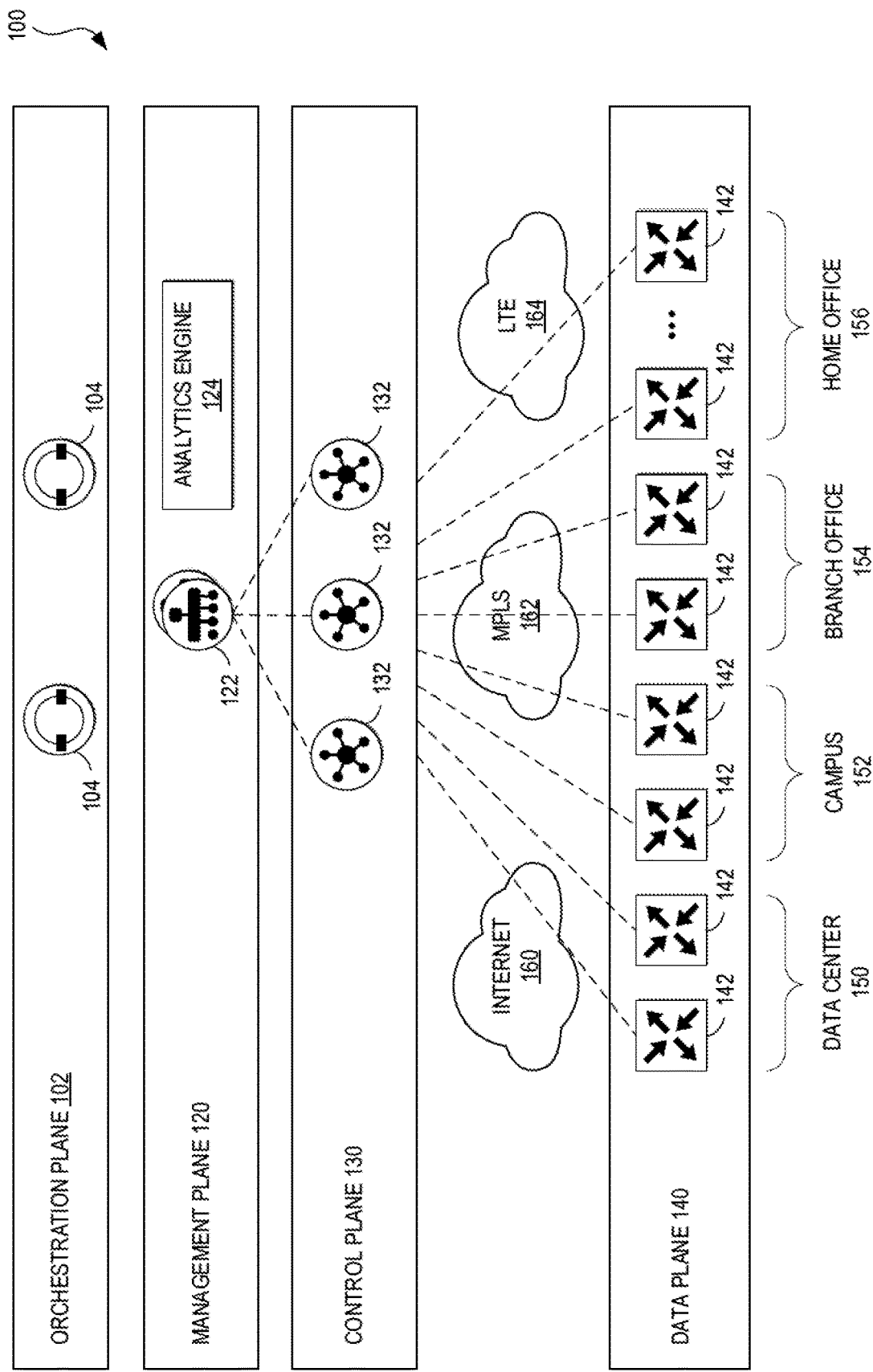
FIG. 1 illustrates an example of a high-level network architecture, in accordance with some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and non-transitory computer-readable media are provided for deploying and configuring intent-driven network branches.

A method can include obtaining, by one or more controllers in a software-defined network (SDN), a branch network design template for deploying a remote branch in the SDN, wherein the branch network design template defines networking settings for a plurality of services to be provisioned at the remote branch; obtaining, by the one or more controllers, a plurality of software packages for the plurality of services to be provisioned at the remote branch; and based on the branch network design template and the plurality of software packages, provisioning, by the one or more controllers, the plurality of services at the remote branch and a network connectivity of the plurality of services.

In some examples of the method, the networking settings correspond to one or more configuration settings defined in the branch network design template, and wherein the one or more configuration settings include at least one of routing settings, security settings, and a specified topology.

In some examples of the method, the method includes receiving one or more configurations defined for the remote branch, the one or more configurations specifying at least one of a topology of the remote branch, the plurality of services to be provisioned at the remote branch, one or more resources to be provisioned at the remote branch, and one or more service chains to be provisioned at the remote branch, wherein provisioning the plurality of services is further based on the one or more configurations.

In some examples of the method, the networking settings associated with the branch network design template define the network connectivity of the plurality of services, and wherein the plurality of software packages includes software for deploying the plurality of services at the remote branch according to the one or more configurations and the networking settings.

In some examples of the method, the one or more configurations define a type of network service associated with each of the plurality of services, and wherein the one or more resources to be provisioned at the remote branch include at least one of one or more virtual switches, one or more single root input/output virtualization (SR-IOV) resources, one or more virtual network functions, one or more interfaces, and one or more network interface cards.

In some examples of the method, the one or more SR-IOV resources include at least one of an SR-IOV port, an SR-IOV interface, and an SR-IOV device.

In some examples of the method, the SDN includes a software-defined wide area network (SD-WAN), and wherein the remote branch comprises an SD-WAN branch.

In some examples of the method, provisioning the plurality of services includes determining that one or more network devices at the remote branch have established connectivity with the SDN; determining that the one or more network devices are associated with the branch network design template; and based on the one or more network devices being associated with the branch network design template, sending, to the one or more network devices, the plurality of software packages and one or more configurations specified for the remote branch.

In some examples of the method, the one or more configurations include at least one of a storage configuration, a memory configuration, a processor configuration, a network interface configuration, a virtual switch configuration, an SR-IOV resource, and a virtual network function (VNF) configuration.

In some examples of the method, the method includes monitoring the plurality of services provisioned at the remote branch; determining that a service of the plurality of services has lost connectivity to the SDN; and generating one or more instructions to restart the service at the remote branch.

A system can include one or more processors and at least one non-transitory computer-readable storage medium having stored therein instructions which, when executed by the one or more processors, cause the one or more processors to perform operations including obtaining, by one or more controllers in a software-defined network (SDN), a branch network design template for deploying a remote branch in the SDN, wherein the branch network design template defines networking settings for a plurality of services to be provisioned at the remote branch; obtaining, by the one or more controllers, a plurality of software packages for the plurality of services to be provisioned at the remote branch; and based on the branch network design template and the plurality of software packages, provisioning, by the one or more controllers, the plurality of services at the remote branch and a network connectivity of the plurality of services.

A non-transitory computer-readable storage medium can include instructions stored therein which, when executed by a processor, cause the processor to perform operations including obtaining, by one or more controllers in a software-defined network (SDN), a branch network design template for deploying a remote branch in the SDN, wherein the branch network design template defines networking settings for a plurality of services to be provisioned at the remote branch; obtaining, by the one or more controllers, a plurality of software packages for the plurality of services to be provisioned at the remote branch; and based on the branch network design template and the plurality of software packages, provisioning, by the one or more controllers, the plurality of services at the remote branch and a network connectivity of the plurality of services.

DESCRIPTION OF EXAMPLE EMBODIMENTS

As previously noted, networks and network technologies are facing significant challenges under an evolving landscape that has resulted in increasing resource and performance demands, network complexities, and security problems, among others. For example, networks frequently experience a variety of complex issues such as, for example, insufficient bandwidth, high bandwidth costs, application downtime, poor service and application performance, operational complexities, complex network environments and connectivity requirements, long and difficult deployments, limited application and resource visibility, security problems, etc.

Some network technologies and architectures, such as software-defined networks (SDNs) and software-defined enterprise networking, can be implemented and can better handle the increasing network demands, challenges, and complexities. Software-defined enterprise networking is part of a broader technology of SDN that includes software-defined wide area networks (SDWAN) and software-defined local area networks (SDLAN). SDN is a centralized approach to network management which can abstract the underlying network infrastructure from its applications. SDNs can de-couple the network's data and control plane functionalities, and can allow a network operator to centralize the intelligence of the network and provide increasing network automation; operations simplification; and centralized provisioning, monitoring, and troubleshooting. Software-defined enterprise networking can apply these principles of SDN to the WAN and a local area network (LAN).

Generally, deploying network segments (e.g., branches, regions, etc.) in a software-defined network can be very difficult and time consuming. For example, to deploy a remote branch in a software-defined enterprise network, an enterprise often performs a great deal of manual, time-consuming steps to setup, connect, and test the remote branch. The high start-up costs and logistical challenges associated with deploying a branch in a network can be difficult to overcome, or even prohibitive, for enterprises.

The disclosed technologies can enable entities, such as enterprises, to quickly, accurately, and easily deploy intent-based network branches in a network. For example, the disclosed technologies can allow an enterprise to efficiently and/or dynamically deploy cloud branches in an SDN of the enterprise. In some examples, the present technologies can be used to implement a branch template that can be used to quickly and/or automatically provision a branch and/or associated resources, such as virtual machines (VMs), software containers, virtual network functions (VNFs), service chains, network interfaces, etc., according to a specific network intent.

FIG. 1 illustrates an example of a network architecture 100 for implementing aspects of the present technology. A non-limiting example of an implementation of the network architecture 100 is the Cisco® SDWAN architecture. Other example implementations are also contemplated herein. Moreover, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the network architecture 100 can include an orchestration plane 102, a management plane 120, a control plane 130, and/or a data plane 140. The orchestration plane can 102 assist in the automatic on-boarding of network devices 142 (e.g., switches, routers, etc.) in an overlay network. The orchestration plane 102 can include one or more physical or virtual network orchestrator appliances 104. In some cases, the network orchestrator appliance(s) 104 can perform the initial authentication of the network devices 142. The network orchestrator appliance(s) 104 can orchestrate connectivity between devices of the control plane 130 and the data plane 140. In some examples, the network orchestrator appliance(s) 104 can enable communication of devices located behind a Network Address Translation (NAT) device, such as a firewall or router. The network orchestrator appliance(s) 104 can include and/or represent physical and/or virtual network nodes. In some examples, physical or virtual Cisco® SD-WAN vBond appliances can operate as the network orchestrator appliance(s) 104.

The management plane 120 can be responsible for central configuration and/or monitoring of a network. The management plane 120 can include one or more physical or virtual network management appliances 122. The management plane 120 can also include an analytics engine 124 for collecting and/or analyzing data associated with the network. The analytics engine 124 can be and/or can be implemented by one or more physical and/or virtual devices.

In some examples, the network management appliance(s) 122 can provide centralized management of the network. In some cases, the network management appliance(s) 122 can provide a graphical user interface to enable a user to monitor, configure, and maintain the network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. The network management appliance(s) 122 can include physical and/or virtual nodes. In some examples, physical or virtual Cisco® SD-WAN vManage appliances can operate as the network management appliance(s) 122.

The control plane 130 can build and maintain a network topology. In some examples, the control plane 130 can make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some examples, the network controller appliance(s) 132 can operate as a route reflector(s). The network controller appliance(s) 132 can orchestrate secure connectivity in the data plane 140 between and among the network devices 142. For example, in some examples, the network controller appliance(s) 132 can distribute cryptographic key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some examples, physical or virtual Cisco® SD-WAN vSmart controllers can operate as the network controller appliance(s) 132.

The data plane 140 can be responsible for forwarding packets based on decisions from the control plane 130. The data plane 140 can include the network devices 142, which can be physical or virtual network devices. In some examples, the network devices 142 can operate at the edges of one or more network environments of an organization, such as in one or more data centers or colocation centers 150, campus networks 152, branch office networks 154, home office networks 156, and so forth, and/or in a cloud (e.g., Infrastructure as a Service (IaaS), Platform as a Service (PaaS), SaaS, and other cloud service provider networks). The network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 6G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The network devices 142 can be responsible for traffic forwarding, security, encryption, quality of service (QoS), and/or routing (e.g., BGP, OSPF, etc.), among other tasks. In some examples, physical or virtual Cisco® SD-WAN vEdge routers can operate as the network devices 142.

Figure 2:
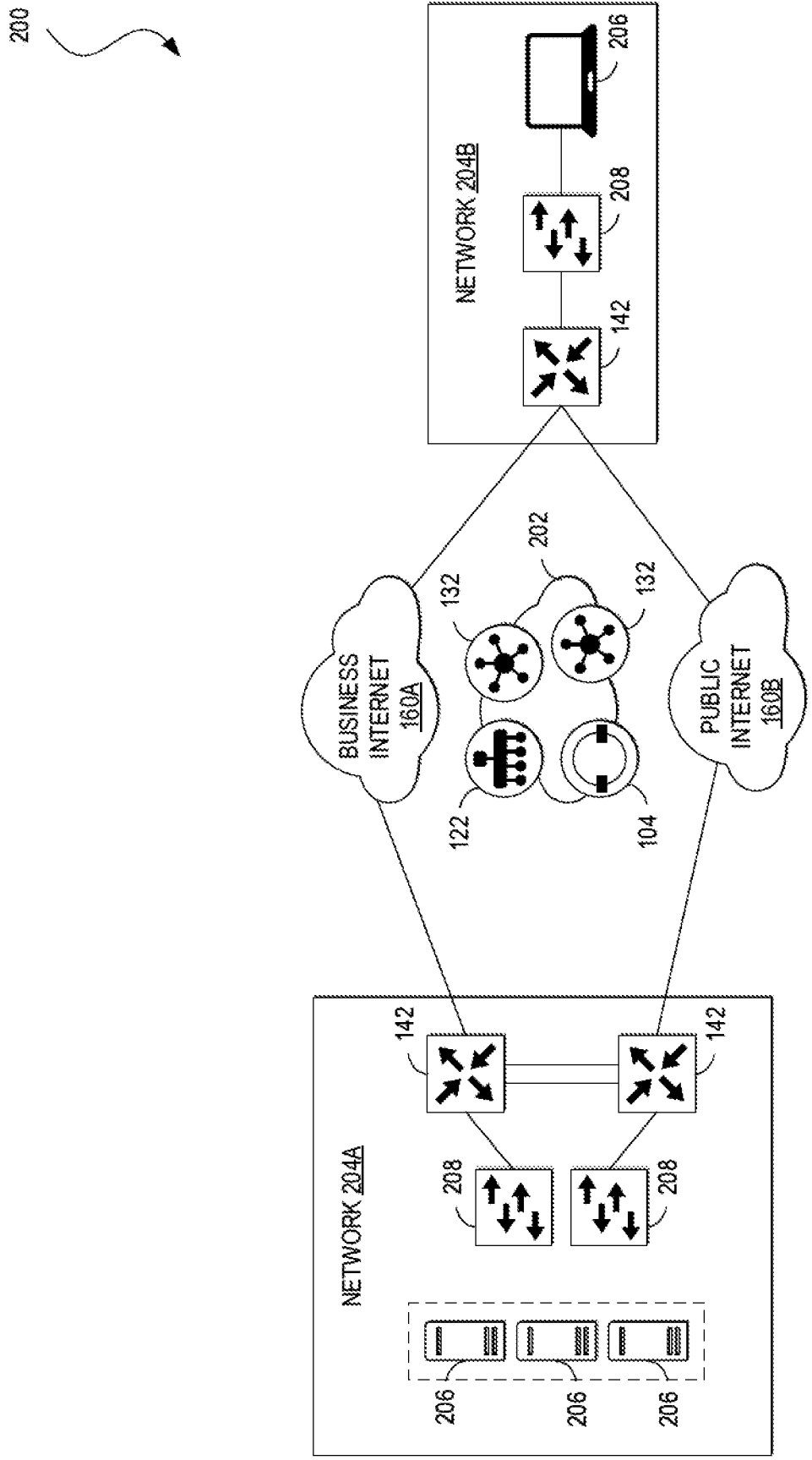
FIG. 2 illustrates an example of a network topology, in accordance with some examples of the present disclosure.

FIG. 2 illustrates an example of a network topology 200 showing various aspects of the network architecture 100. The network topology 200 can include a management network 202, network sites 204A and 204B (collectively, 204) (e.g., the data center(s) 150, the campus network(s) 152, the branch office network(s) 154, the home office network(s) 156, cloud service provider network(s), etc.), and Internet transport networks 160A and 160B (collectively, 160). In some examples, the management network 202 can include one or more network orchestrator appliances 104, one or more network management appliance 122, and one or more network controller appliances 132. Although the management network 202 is shown as a single network in this example, one of ordinary skill in the art will understand that each or any element of the management network 202 can be distributed across any number of networks and/or co-located with the sites 204. In this example, each element of the management network 202 can be reached through either transport network 160A or 160B.

Each site can include one or more endpoints 206 connected to one or more site network devices 208. The endpoints 206 can include computing devices (e.g., servers, workstations, desktop computers, etc.), mobile computing devices (e.g., laptops, tablets, mobile phones, etc.), smart wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, doorbells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can include any number of network devices in any network topology, including multi-tier (e.g., core, distribution, and access tiers), spine-and-leaf, mesh, tree, bus, hub and spoke, and so forth. For example, in some examples, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more network devices 142, and the network devices 142 can be used to connect to the transport networks 160.

In some examples, "color" (e.g., descriptors, attributes, etc.) can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some examples, each network device 208 can form a Datagram Transport Layer Security (DTLS) or TLS control connection to the network controller appliance(s) 132 and connect to any network control appliance 132 over each transport network 160. In some examples, the network devices 142 can securely connect to network devices in other sites via tunnels, such as IPSec tunnels. In some examples, the BFD protocol may be used within each of these tunnels to detect loss, latency, jitter, and path failures.

On the network devices 142, color (e.g., descriptors, attributes, etc.) can be used help to identify or distinguish an individual WAN transport tunnel (e.g., no same color may be used twice on a single network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the network devices 142 use a private color, they may attempt to build IPSec tunnels to other network devices using native, private, underlay IP addresses. The public colors can include 3g, biz, internet, blue, bronze, custom1, custom2, custom3, default, gold, green, lte, public-internet, red, and silver. The public colors may be used by the network devices 142 to build tunnels to post-NAT IP addresses (if there is NAT involved). If the network devices 142 use private colors and need NAT to communicate to other private colors, the carrier setting in the configuration can dictate whether the network devices 142 use private or public IP addresses. Using this setting, two private colors can establish a session when one or both are using NAT.

Figure 3:
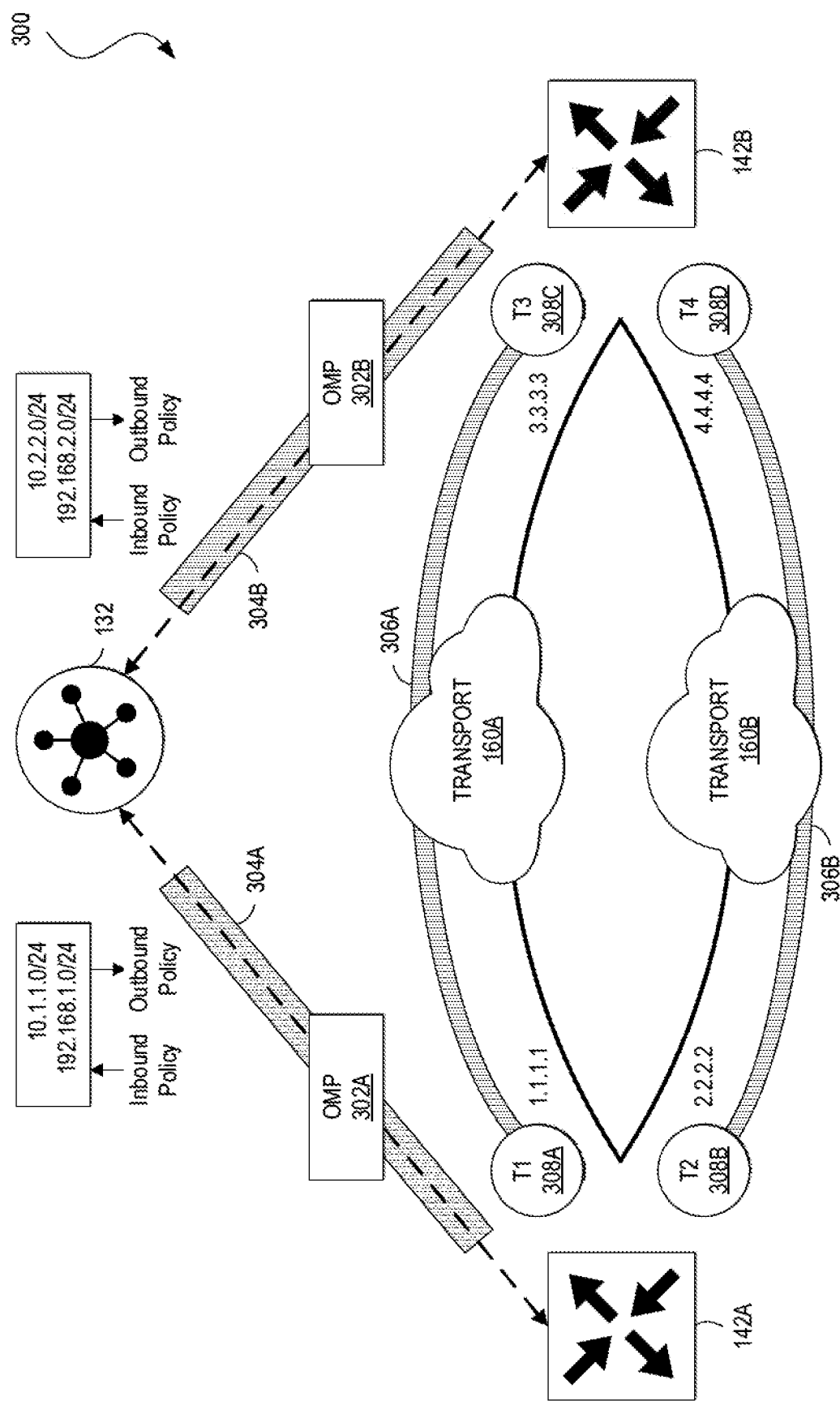
FIG. 3 illustrates a diagram showing an example operation of a protocol for managing an overlay network, in accordance with some examples of the present disclosure.

FIG. 3 illustrates a diagram 300 showing an example OMP operation. In some examples, OMP can be used to manage an overlay of a network (e.g., the network architecture 100). In this example, OMP messages 302A and 302B (collectively, 302) may be exchanged between the network controller appliance 132 and the network devices 142A and 142B, respectively. In some examples, OMP messages 302 can be used to exchange control plane information, such as route prefixes, next-hop routes, crypto keys, policy information, and so forth, over respective secure DTLS or TLS connections 304A and 304B. The network controller appliance 132 can operate similarly to a route reflector. For example, the network controller appliance 132 can receive routes from the network devices 142, process and apply any policies to them, and advertise routes to other network devices 142 in the overlay. If there is no policy defined, the network devices 142 may behave in a manner similar to a full mesh topology, where each network device 142 can connect to another network device 142 at another site and receive routing information from each site.

OMP can advertise various types of routes. For example, OMP can advertise OMP routes. OMP routes can correspond to prefixes that are learned from the local site, or service side, of the network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can be similar to a BGP next-hop IP address) and/or other attributes such as origin, originator, preference, site identifier, tag, and virtual private network (VPN). An OMP route may be installed in the forwarding table if the TLOC to which it points is active.

In some examples, OMP can advertise TLOC routes. TLOC routes can correspond to logical tunnel termination points on the network devices 142 that connect into the transport networks 160. In some aspects, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some examples, a TLOC may be in an active state on a particular network device 142 when an active BFD session is associated with that TLOC.

In some examples, OMP can advertise service routes. Service routes can represent services (e.g., firewall, distributed denial of service (DDoS) mitigator, load balancer, intrusion prevent system (IPS), intrusion detection systems (IDS), WAN optimizer, etc.) that may be connected to the local sites of the network devices 142 and accessible to other sites for use with service insertion. In addition, these routes can include VPNs. In some cases, the VPN labels can be sent in an update type to tell the network controller appliance 132 what VPNs are serviced at a remote site.

In the example of FIG. 3, OMP is shown running over the DTLS/TLS tunnels 304 established between the network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
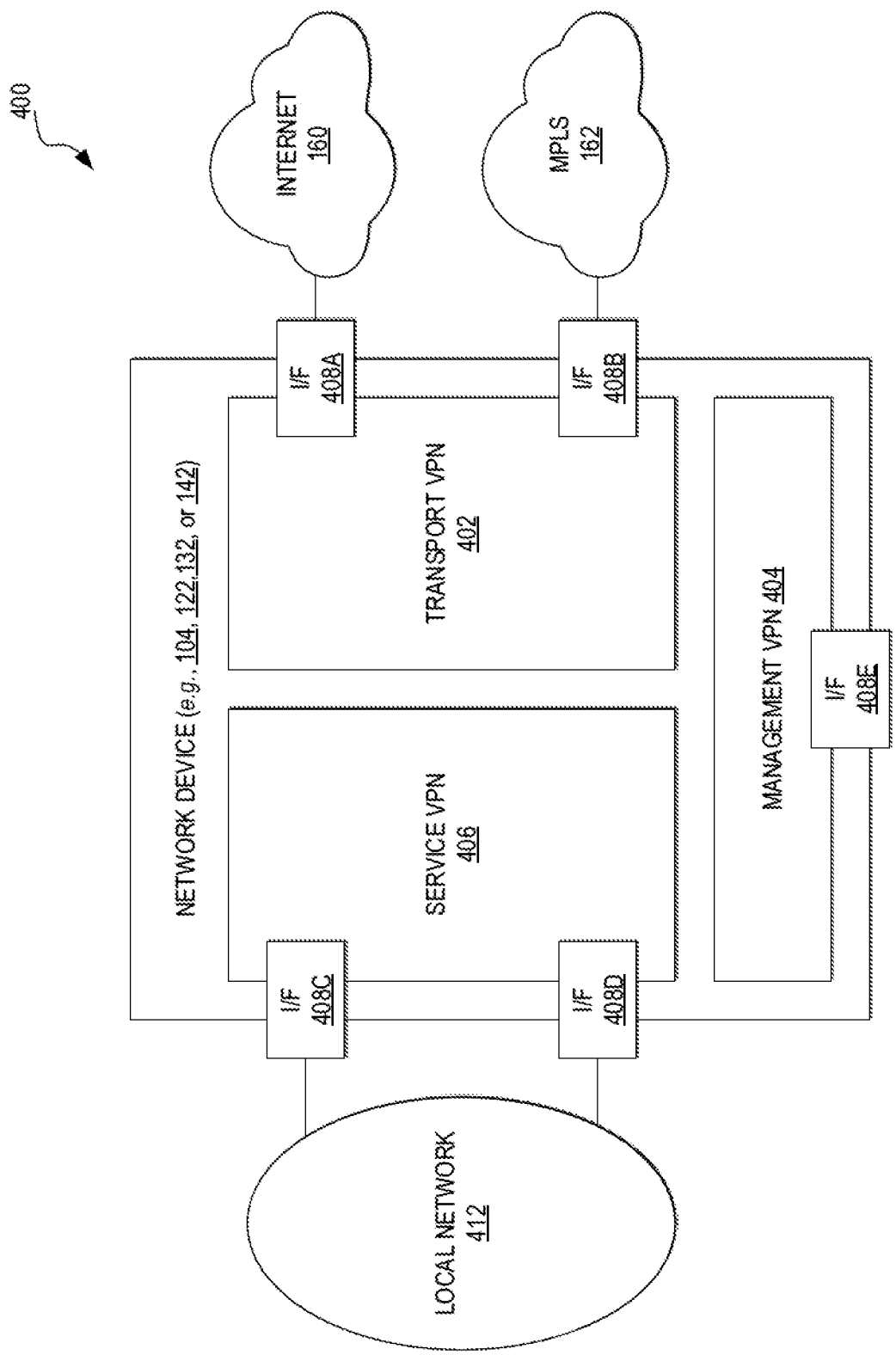
FIG. 4 illustrates a diagram showing an example operation of virtual networks, in accordance with some examples of the present disclosure.

FIG. 4 illustrates an example of a diagram 400 showing an example operation of virtual networks. In this illustrative example, the virtual networks include VPNs. However, other examples can include any other types of networks. The VPNs can be used in some examples to provide segmentation and/or isolation for a network (e.g., the network architecture 100) and/or network communications. VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. In some examples, the network orchestrator appliance(s) 104, network management appliance(s) 122, network controller appliance(s) 132, and/or edge network device(s) 142 can each include a transport VPN 402 and a management VPN 404.

The transport VPN 402 can include one or more physical or virtual network interfaces 408A and 408B that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. Static or default routes or a dynamic routing protocol can be configured inside the transport VPN 402 to get next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 408E. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or network device(s) 142 can include one or more service-side VPNs 406. The service-side VPN 406 can include one or more physical or virtual network interfaces 408C and 408D that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some examples, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. The network interfaces 408A-E (collectively, 408) can be physical interfaces, virtual interfaces, or be subinterfaces.

Controller appliances 132 as described in FIGS. 1-4 or other controllers can be configured to deploy/implement, manage, etc., a network, such as a software-defined network, and/or one or more segments of a network, such as a remote branch of a network. As further described herein, a controller can use software packages, such as VM and/or VNF packages, to implement a network segment, such as a remote branch of a network (e.g., an SDN).

Figure 5A:
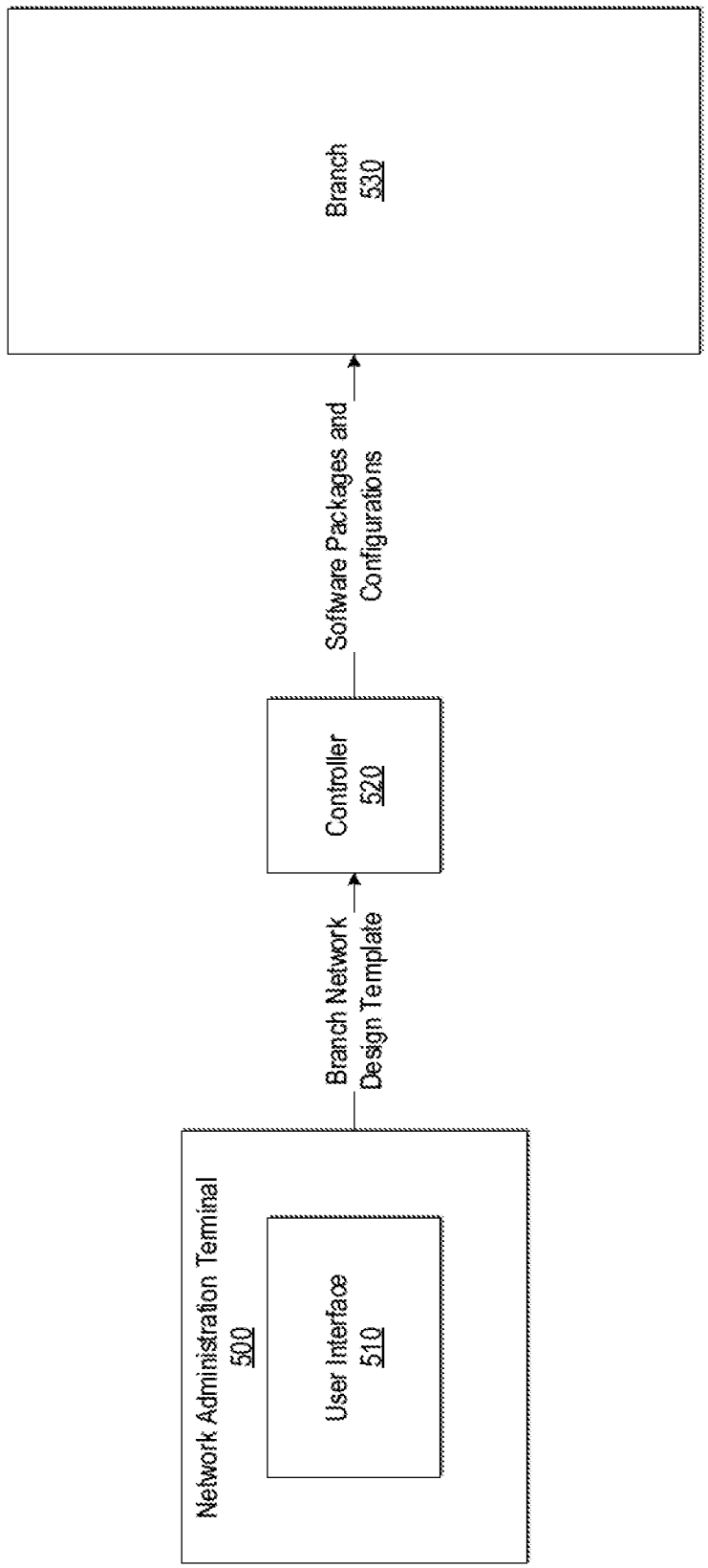
FIGS. 5A and 5B illustrate example systems for deploying intent-based network branches, in accordance with some examples of the present disclosure.

FIG. 5A illustrates an example system for deploying intent-based branches of a network, such as an SDN. For example, the system can deploy an intent-based cloud branch at a remote location of an SDN. In some examples, the SDN can be a software-defined wide-area network (SD-WAN).

In an intent-driven remote branch, the intent can determine what kind of branch 530 will be deployed, how the branch 530 is to be configured, what resources (e.g., services, devices, components, etc.) are to be included in the branch 530, a topology of the branch 530 (internally and/or within the SDN), etc. At a user interface 510 of a network administration terminal 500, a user, such as a network administrator, can input branch-specific configurations for branch 530. The branch-specific configurations can reflect an intent for branch 530. In some examples, the intent can be specified as a branch network design template selected for branch 530 and/or branch-specific configurations to be used in conjunction with, and/or to be applied by, the branch network design template when deploying branch 530. In some examples, the intent can include one or more specifications for the branch 530 (e.g., type of branch, types of interfaces for the branch, types of links for the branch, types of resources for the branch, types of connectivity for the branch, a topology, etc.), which can be used with a branch network design template to build/deploy the branch 530.

In some cases, the branch network design template can specify resources (e.g., VMs, software containers, VNFs, service chains, virtual devices, links, etc.), network settings, policies, etc., to be deployed at, and/or to be used to deploy, a remote branch (e.g., branch 530). The remote branch can be created using the branch network design template, along with software packages (e.g., VM packages, VNF packages, software container packages, virtual resource packages, etc.) for resources to be provisioned at the branch network. In some examples, the branch network design template can specify network settings used to dynamically configure connectivity (e.g., routing, security, etc.) for the remote branch (and/or one or more services, devices, components, etc., associated with the remote branch).

In some examples, a service chain construct(s) can be used to create one or more service chains for a remote branch. The service chain construct(s) can define a service chain(s) for SDN traffic associated with the remote branch.

Network administration terminal 500 can send the branch network design template to controller 520. In some examples, network administration terminal 500 can also send and/or upload software packages (e.g., VM packages, software containers, VNF packages, virtual device packages, etc.) and/or branch intent definitions (e.g., branch-specific configurations or attributes) to controller 520. In some examples, network administration terminal 500 can be part of, or implemented by, a controller or node at the SDN or connected to the SDN, such as a centralized SDN controller (e.g., controller 520 or any other controller). In some examples, network administration terminal 500 can be part of, or implemented by, one or more separate/different network devices (physical or virtual), such as controller 520 or any other node. In some cases, controller 520 can be part of or implemented by a device (virtual and/or physical) and/or any node at the SDN. In some cases, controller 520 can be part of or implemented by a controller on the SDN, such as a centralized SDN controller.

In some examples, the branch network design template and/or associated branch-specific attributes/configurations defined for branch 530, can define services or functions, such as VNFs, for the branch 530. The services or functions can be deployed using one or more of the software packages (e.g., VMs) and configured based on the branch network design template and any associated branch-specific attributes/configurations. In some examples, the software packages and branch network design template can be used to construct a service chain(s) for processing traffic to and/or from the branch 530. In some examples, the branch network design template can define resources and/or networking settings associated with one or more services and/or functions, such as one or more VNFs. The resources can include, for example and without limitation, virtual switches, single root input/output virtualization (SR-IOV) resources, network interface cards, virtual firewalls, interfaces, and/or any other virtual network devices and/or resources. In some examples, SR-IOV resources can include SR-IOV ports, SR-IOV interfaces, SR-IOV devices, and/or the like.

Controller 520 can receive the branch network design template from network administration terminal 500. Controller 520 can use the branch network design template to automatically deploy branch 530. For example, controller 520 can use software packages (e.g., VMs, VNFs, etc.), the branch network design template and one or more branch-specific configurations/attributes defined for branch 530, to automatically provision the branch 530 (and/or one or more branch resources, components, devices, etc.). For example, controller 520 can use the software packages, the branch network design template, and any branch-specific attributes/configurations defined to provision branch connectivity (and/or node connectivity), resources (e.g., services, virtual devices, service chains, etc.) and associated network configurations, etc.

In some examples, controller 520 can receive one or more branch-specific attributes/configurations defined by a user for the branch 530, such as ports, links, services, resource types, topology, service chains, etc., and use the one or more branch-specific attributes/configurations to provision various aspects of the branch 530 accordingly. The branch network design template can define network settings (e.g., policies, routing, security, constructs, objects, rules, requirements, etc.) that can be used to configure the network connectivity for the branch 530 and/or any resources provisioned (e.g., virtual devices, services, components, service chains, functionalities, etc.) at the branch 530 based on the software packages (e.g., pre-built software packages, software packages uploaded to controller 520 and/or software packages stored at controller 520) and any branch-specific attributes/configurations defined for branch 530. In some examples, controller 520 can use the branch network design template and software packages to automatically install and configure chains of virtual network functions and/or virtual devices for branch 530.

In some cases, controller 520 can obtain the software packages (e.g., virtual machine packages, etc.), the branch network design template, and/or the branch-specific attributes/configurations (e.g., the attributes/configurations to be used along with the branch network design template to deploy the branch 530) from a centralized repository or any other source. In some cases, controller 520 can similarly obtain software packages and/or service chain constructs for deploying chains of virtual network functions from a centralized repository or from another source. In some examples, a user can upload the software packages and specify (e.g., via user interface 510) one or more branch-specific attributes/configurations for deploying the branch 530. Controller 520 can use the branch network design template to automatically provision and/or deploy (e.g., setup/configure) the branch 530 (e.g., including associated resources, connectivity, policies, etc.) based on the one or more branch-specific attributes/configurations and the software packages.

In some cases, the branch network design template can define routes, protocols, ports, addresses, interfaces, rules and/or settings for configuring branch resources, connectivity, policies, etc. In some examples, the one or more branch-specific attributes/configurations can define an intent for the branch (e.g., a type of branch, one or more types of resources, one or more types of links, a branch topology, etc.), and controller 520 can use the branch network design template to automatically and/or dynamically generate, apply and/or provision configurations for deploying the branch 530 according to such intent. The controller 520 can use software packages to provision services and/or resources on the branch 530 as previously noted. The controller 520 can configure such services and/or resources according to the defined intent and/or specifications in the branch network design template.

In some examples, controller 520 can send the software packages and associated service and/or service chain configurations to branch 530. In some examples, controller 520 can determine that certain network devices at branch 530 have established connectivity with the SDN, and determine that the network devices are associated with the branch network design template. Controller 520 can then send the software packages, branch network design template, and any associated branch-specific attributes/configurations to such network devices for deployment and/or implementation.

In some examples, the associated branch configurations can include storage configurations, memory configurations, processor configurations, network interface configurations, virtual switch and/or router configurations, SR-IOV resources, port configurations, link/connectivity configurations, service configurations, VNF configurations, routes, addresses, control plane information, and/or the like. In some examples, the associated configurations can be determined based on the branch network design template and/or branch-specific attributes/configurations defined. For example, in some cases, the associated configurations can be dynamically generated based on the branch network design template and the branch-specific attributes/configurations defined.

In some examples, when branch 530 comes online, controller 520 associates branch 530 with the branch network design template. This can trigger the provisioning of services associated software packages (e.g., VM packages, software containers, etc.), VNF service chains, associated configurations, connectivity, etc.

Controller 520 can monitor the virtual machines provisioned at branch 530. In some examples, controller 520 can determine that a node (e.g., a device, a VM, a resource, etc.) and/or service has lost connectivity to the SDN and generate commands to restart the node and/or service at branch 530.

In some cases, an intent can be catered to the design and/or configuration to be used to deploy branch 530. For example, an intent can be tailored to the type of resources (e.g., VMs, software containers, Open vSwitch (OVS), single root input/output virtualization (SRIOV), interfaces, etc.), services, configurations, architecture, topology, service chains, etc., to be used to deploy branch 530. Given the demands of the network, specific software packages, such as VMs or virtual network function (VNF) packages, can be uploaded for implementation. When the branch virtual appliance (e.g., a branch device and/or service) is powered on, it can be automatically discovered by controller 520 and/or another management and/or monitoring device.

When the branch comes online, the controller can associate the branch with a branch network design template. The branch design template can fulfill (e.g., can implement, configure, apply, etc.) the intent defined for the remote branch. The controller can send to the branch (e.g., to edge devices at the branch) the branch design template, software packages to deploy and configure resources (e.g., virtual machines, services, service chains, interfaces, devices, etc.) and any branch-specific configurations defined for the branch. The branch (e.g., one or more devices at the branch) can use the branch design template, software packages, and any branch-specific configurations and build (e.g., install and configure) branch components (e.g., services, links/connectivity, virtual devices, service chains, etc.) according to configurations defined in the branch network design template and the branch-specific configurations. In some examples, the branch network design template can provide information for configuring networking settings and connectivity for branch networks (e.g., routes, interfaces, addresses, protocols, ports, policies, requirements, control plane-related details, etc.). The branch network design template can automate the configuration of networking settings for the branch (and/or branch resources). Any branch-specific configurations defined for the branch can allow networking settings and/or resource configurations to then be customized for the branch according to an intent reflected in the branch-specific configurations.

In some examples, a software package available at, and/or provided by, the controller can be compatible with SRIOV, OVS, network interface cards (NICs), vManage, and/or any other resource, protocol, platform, cloud, etc. The controller can configure (and/or provide) the remote branch the software packages, the template, the configurations, etc., to configure software services and resources (e.g., VMs, software containers, service chains, virtual devices, services, nodes, interfaces, components, etc.) in the remote branch to be deployed, monitored, managed, etc. In some examples, if a remote node (e.g., VM, software container, virtual device, etc.) goes offline, the remote node can automatically restart. In some examples, the remote node can be configured to automatically restart when it goes offline (e.g., when it loses connectivity to other devices in the network and/or outside of the network). In other examples, a device within a same network segment (physical and/or logical) as the remote node can be configured to attempt to communicate with the remote node and attempt to send the remote node an instruction to restart. For example, if the remote node loses connectivity to some portions of the network and/or external networks but retains connectivity to a local segment of the network, a device within the local segment may send an instruction to the remote node to trigger the remote node to restart.

In some examples, the remote branch can be managed from the cloud. In some examples, other branches can communicate with (e.g., send/receive traffic to/from) the remote branch (e.g., a remote branch deployed as described herein) using links that can include, for example, SDWAN links, service chains, etc. The links (e.g., SDWAN links, service chains, etc.) can route and process the traffic according to associated services and functionalities.

Figure 5B:
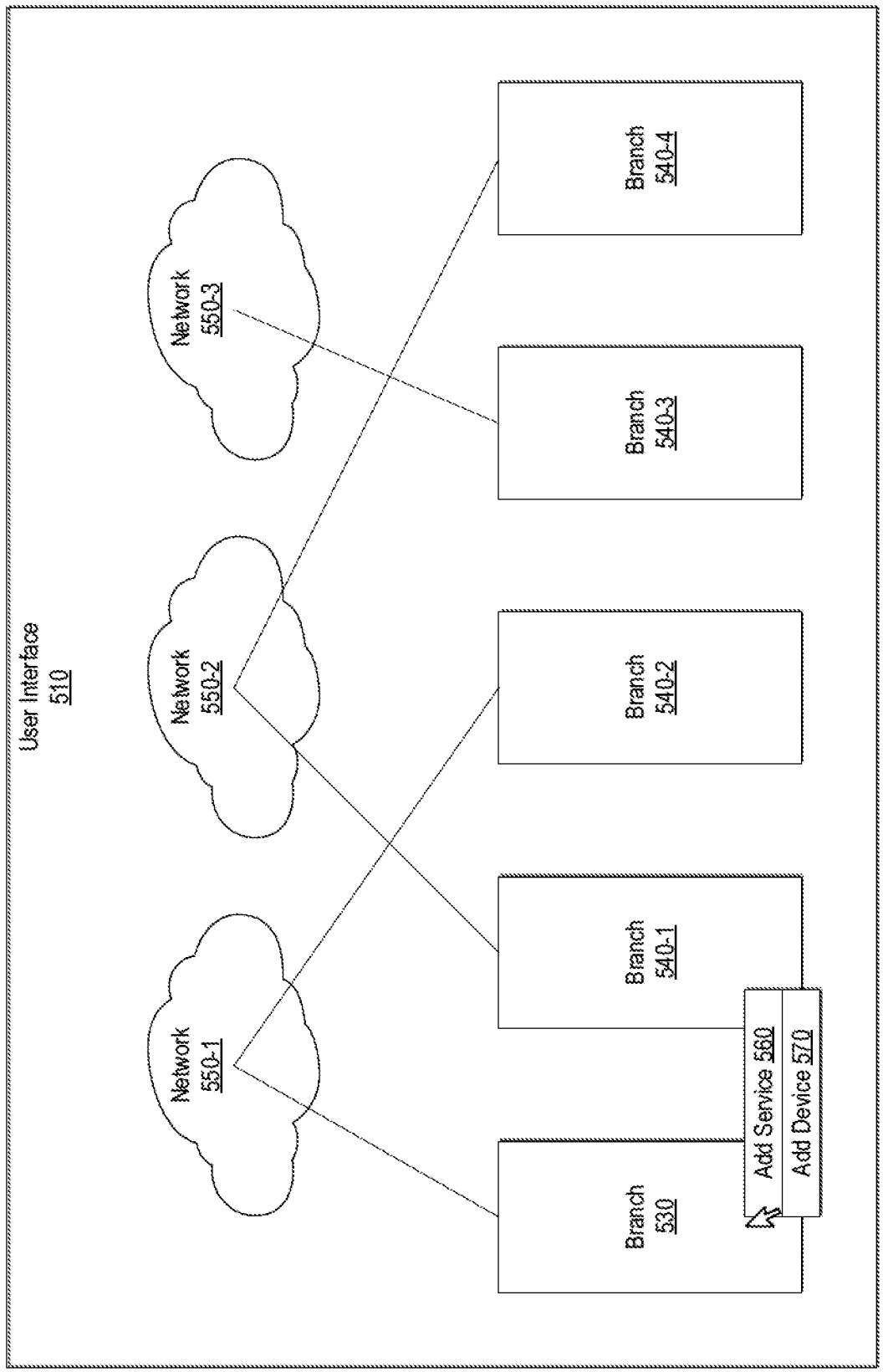

FIG. 5B illustrates an example system for defining an intent for deploying one or more branches in a network environment. User interface 510 on network administration terminal 500 can enable a user to input custom configurations reflecting a configuration/deployment intent that can be used along with a branch network design template to deploy branch 530 (and/or associated services, resources, devices, etc.).

Branch 530 can have its own branch network design template created in user interface 510 and/or can be associated with a branch network design template created for network branches. Branch 530 can be connected to any of networks 550-1, 550-2, and 550-3, as is seen with existing branch templates for branches 540-1, 540-2, 540-3, and 540-4. In some examples, a topology of the branch 530 can be defined through the user interface 510 when creating the branch 530. The branch template can be assigned to the branch 530 for use in configuring networking settings and connectivity for the branch 530.

Moreover, attributes of branch 530 can be configured through the user interface 510. Such attributes can include custom settings, resources, devices, topology, interfaces, services, links, architecture, etc., defined for branch 530. The attributes can be used when deploying branch 530 to automatically configure/customize branch 530 accordingly.

Button 560 and button 570 are example input elements that a user, such as a network administrator, can use to add (e.g., define) services or devices to be deployed at branch 530. For example, the user can use button 560 and button 570 to select specific services for branch 530. In some cases, when adding the specific services, the user can specify any attributes for those services. The selected services can be automatically provisioned at branch 530 based on any specified attributes and associated software packages. The branch network design template for branch 530 can provide any networking settings used to establish network connectivity (e.g., routing, security, etc.) for the provisioned services. The branch design template can allow the network connectivity to be automatically configured for the provisioned services.

For example, the branch design template can define the network connectivity and settings to apply when deploying branch 530 in order to establish the network connectivity and communications for branch 530. A device can use the information in the branch design template to automatically configure the branch 530 being deployed. This way, the user does not have to manually configure and establish the network connectivity for the provisioned services. The user can similarly provision other services, resources, devices, branches, etc., without manually configuring the network connectivity each time. In some cases, the branch design template can be used to similarly deploy other branches or networks. This can allow deployment of branches to be significantly automated. Moreover, in some cases, multiple branch design templates can be defined and tailored for different environments, networks, requirements, etc. A desired branch design template can be selected when deploying a branch or network as needed or desired.

Figure 6:
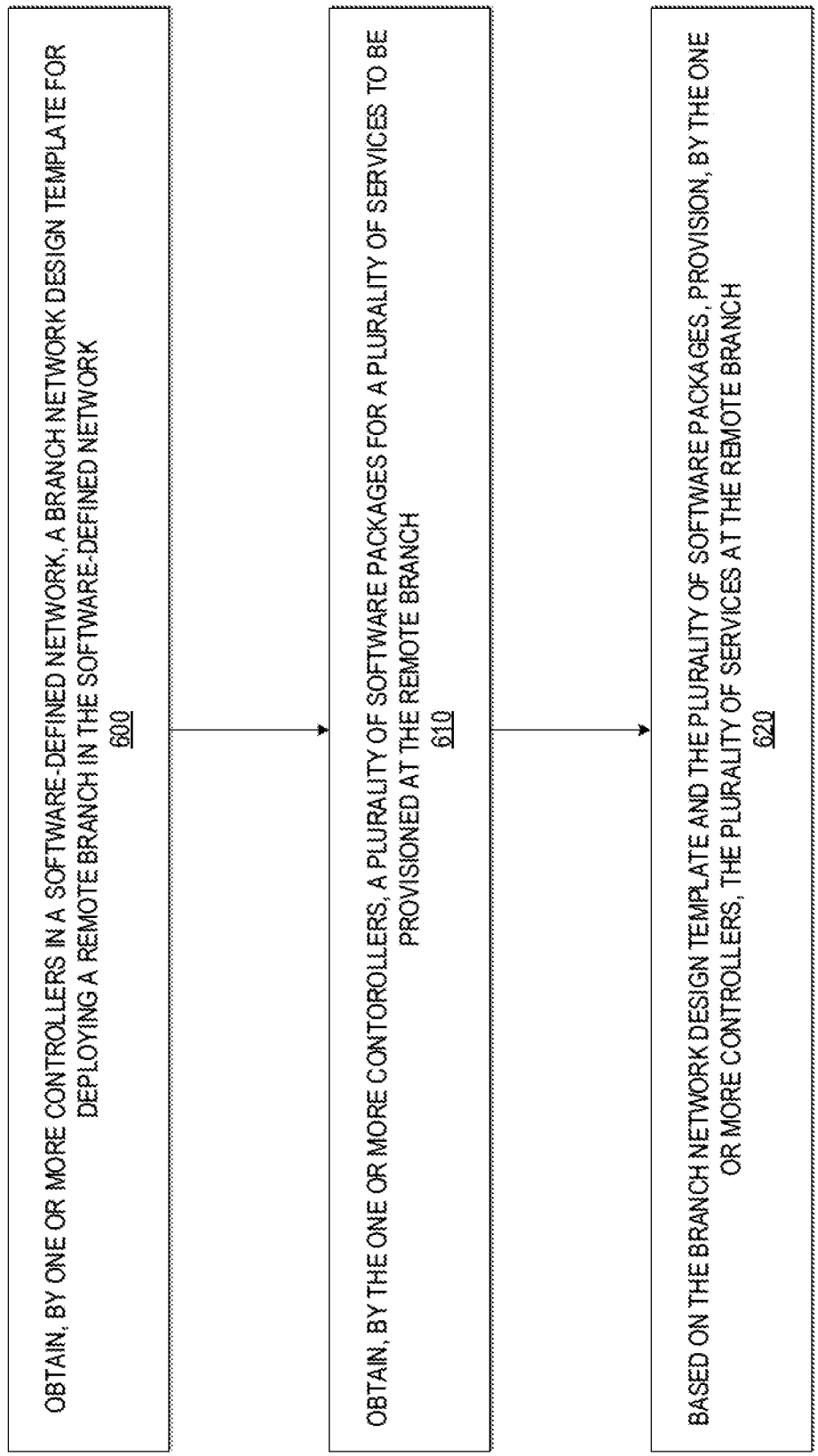
FIG. 6 illustrates an example method for deploying intent-based network branches, in accordance with some examples of the present disclosure.

FIG. 6 illustrates an example method for deploying intent-based network branches. A controller can obtain a branch network design template, obtain relevant software packages, and provision services at the remote branch.

The method begins when one or more controllers in a SDN obtain (600) a branch network design template for deploying a remote branch in the SDN. The branch design template can define a plurality of software packages to be provisioned at the remote branch. In some examples, the branch design template can define networking settings for services to be provisioned at the remote branch. In some examples, the networking settings can correspond to one or more configuration settings defined in the branch network design template. The one or more configuration settings can include routing settings, policies, security settings, a specified topology, etc. In some examples, the SDN can be a software-defined wide area network (SD-WAN), and the remote branch can be an SD-WAN branch.

The one or more controllers obtain (610) a plurality of software packages for a plurality of services to be provisioned at the remote branch. The software packages can include, for example and without limitation, packages for VMs, software containers, virtual devices, interfaces, applications, VNFs, and/or any other resources.

Based on the branch network design template and the plurality of software packages, the one or more controllers provision (620) the plurality of services at the remote branch. In some examples, provisioning the plurality of services can include determining that one or more network devices at the remote branch have established connectivity with the SDN, determining that the one or more network devices are associated with the branch network design template and, based on the one or more network devices being associated with the branch network design template, sending, to the one or more network devices, the plurality of software packages and one or more configurations specified for the remote branch. In some examples, the one or more configurations specified for the remote branch can include at least one of a storage configuration, a memory configuration, a processor configuration, a network interface configuration, a virtual switch configuration, an SR-IOV resource, and a virtual network function (VNF) configuration.

In some examples, the method can include receiving one or more configurations defined for the remote branch, the one or more configurations specifying at least one of a topology of the remote branch, the plurality of services to be provisioned at the remote branch, one or more resources to be provisioned at the remote branch, and one or more service chains to be provisioned at the remote branch. In some examples, provisioning the plurality of services can be further based on the one or more configurations. In some examples, the networking settings associated with the branch network design template can define a network connectivity of the plurality of services, and the plurality of software packages can include software for deploying the plurality of services at the remote branch according to the one or more configurations and the networking settings. In some examples, the one or more configurations can define a type of network service associated with each of the plurality of services. In some cases, the one or more resources to be provisioned at the remote branch can include at least one of one or more virtual switches, one or more single root input/output virtualization (SR-IOV) resources, one or more virtual network functions, one or more interfaces, and one or more network interface cards. In some examples, the one or more SR-IOV resources can include at least one of an SR-IOV port, an SR-IOV interface, and an SR-IOV device.

In some examples, the method can include monitoring the plurality of services provisioned at the remote branch, determining that a service of the plurality of services has lost connectivity to the SDN, and generating one or more instructions to restart the service at the remote branch.

Figure 7:
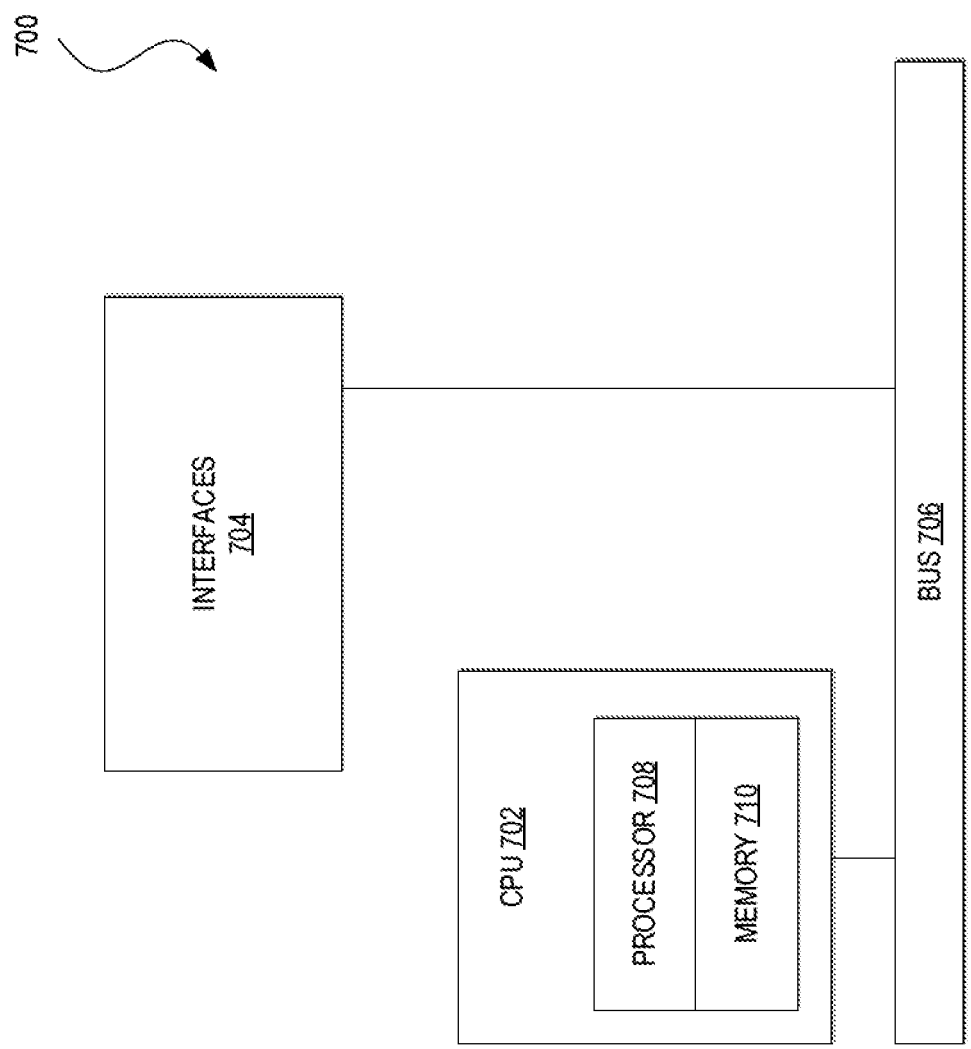
FIG. 7 illustrates an example of a network device, in accordance with some examples of the present disclosure.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
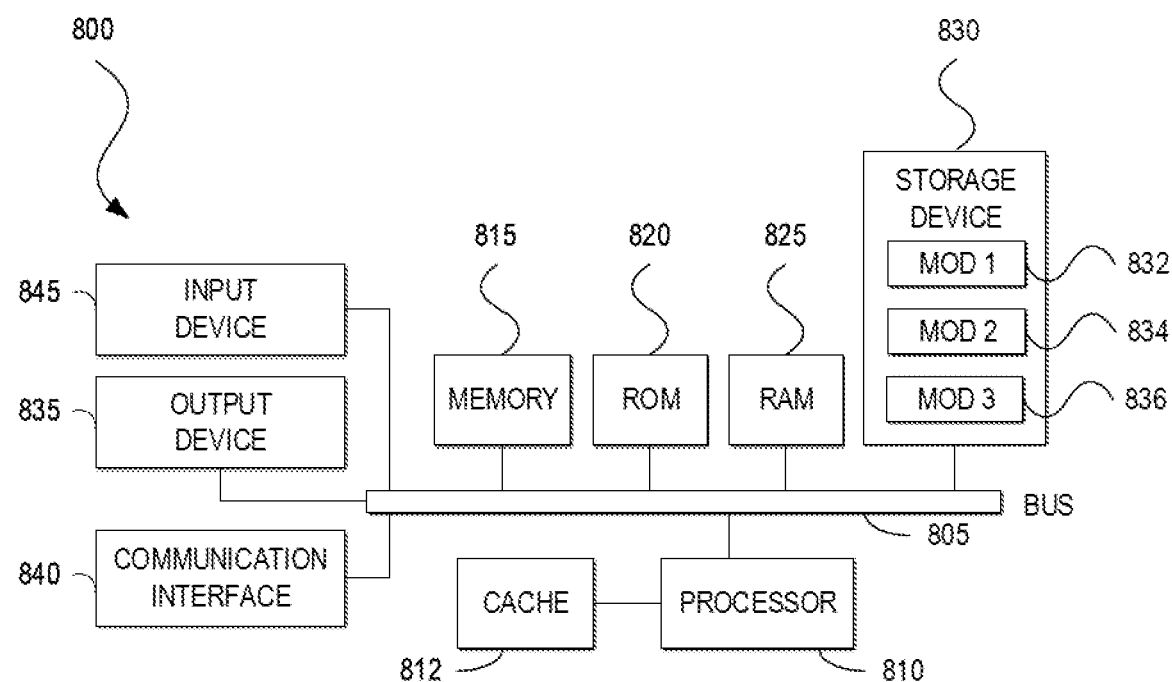
FIG. 8 illustrates an example computing system architecture, in accordance with some examples of the present disclosure.

FIG. 8 illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set or "one or more of" a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

What is claimed is:

1. A method comprising:
   obtaining, by one or more controllers in a software-defined network (SDN), a branch network design template for deploying an intent-based remote branch in the SDN, wherein the branch network design template is based on an intent associated with the intent-based remote branch and defines networking settings for a plurality of services to be provisioned at the intent-based remote branch;
   obtaining, by the one or more controllers, a plurality of software packages for the plurality of services to be provisioned at the intent-based remote branch, wherein one or more of the plurality of software packages are determined based on the branch network design template;
   determining, by the one or more controllers, that one or more devices associated with the intent-based remote branch have established connectivity with the SDN, wherein the one or more devices are indicated for inclusion in the intent-based remote branch by the branch network design template; and
   based on determining that one or more devices associated with the intent-based remote branch have established connectivity with the SDN, sending, by the one or more controllers, the branch network design template and the plurality of software packages to the one or more devices associated with the intent-based remote branch, the branch network design template and the plurality of software packages causing the one or more devices to deploy the plurality of services at the intent-based remote branch, configure a network connectivity of the plurality of services, implement a network topology defined by the branch network design template, and configure a transport network that interconnects the intent-based remote branch with the SDN, the transport network being configured based on one or more settings in the branch network design template.

2. The method of claim 1, wherein the networking settings correspond to one or more configuration settings defined in the branch network design template, and wherein the one or more configuration settings comprise at least one of routing settings, security settings, and the network topology.

3. The method of claim 1, further comprising receiving one or more configurations defined for the intent-based remote branch, the one or more configurations specifying at least one the network topology of the intent-based remote branch, the plurality of services to be provisioned at the intent-based remote branch, one or more resources to be provisioned at the intent-based remote branch, and one or more service chains to be provisioned at the intent-based remote branch, wherein sending the branch network design template and the plurality of software packages includes sending the one or more configurations defined for the intent-based remote branch, wherein the branch network design template, the plurality of software packages, and the one or more configurations cause the one or more devices to provision the plurality of services.

4. The method of claim 3, wherein the networking settings associated with the branch network design template define the network connectivity of the plurality of services, and wherein the plurality of software packages includes software for deploying the plurality of services at the intent-based remote branch according to the one or more configurations and the networking settings.

5. The method of claim 3, wherein the one or more configurations define a type of network service associated with each of the plurality of services, and wherein the one or more resources to be provisioned at the intent-based remote branch comprise at least one of one or more virtual switches, one or more single root input/output virtualization (SR-IOV) resources, one or more virtual network functions, one or more interfaces, and one or more network interface cards.

6. The method of claim 5, wherein the one or more SR-IOV resources comprise at least one of an SR-IOV port, an SR-IOV interface, and an SR-IOV device.

7. The method of claim 1, further comprising:
   receiving one or more configurations defined for the intent-based remote branch, wherein sending the branch network design template and the plurality of software packages includes sending the one or more configurations defined for the intent-based remote branch, wherein the branch network design template, the plurality of software packages, and the one or more configurations cause the one or more devices to deploy the plurality of services at the intent-based remote branch, configure the network connectivity of the plurality of services, implement the network topology, and configure the transport network, wherein the SDN comprises a software-defined wide area network (SD-WAN), and wherein the intent-based remote branch comprises an SD-WAN branch.

8. The method of claim 1, further comprising:
   determining that the one or more devices are associated with the branch network design template; and
   based on the one or more devices being associated with the branch network design template, sending, to the one or more devices, the plurality of software packages, the branch network design template, and one or more configurations specified for the intent-based remote branch.

9. The method of claim 8, wherein the one or more configurations comprise at least one of a storage configuration, a memory configuration, a processor configuration, a network interface configuration, a virtual switch configuration, an SR-IOV resource, and a virtual network function (VNF) configuration.

10. The method of claim 1, further comprising:
monitoring the plurality of services provisioned at the intent-based remote branch;
determining that a service of the plurality of services has lost connectivity to the SDN; and
based on determining that the service has lost connectivity to the SDN, generating one or more instructions to restart the service at the intent-based remote branch.

11. A system comprising:
one or more processors; and
at least one non-transitory computer-readable storage medium having stored therein instructions which, when executed by the one or more processors, cause the one or more processors to perform operations comprising:
obtaining, by one or more controllers in a software-defined network (SDN), a branch network design template for deploying an intent-based remote branch in the SDN, wherein the branch network design template is based on an intent associated with the intent-based remote branch and defines networking settings for a plurality of services to be provisioned at the intent-based remote branch;
obtaining, by the one or more controllers, a plurality of software packages for the plurality of services to be provisioned at the intent-based remote branch, wherein one or more of the plurality of software packages are determined based on the branch network design template;
determining, by the one or more controllers, that one or more devices associated with the intent-based remote branch have established connectivity with the SDN, wherein the one or more devices are indicated for inclusion in the intent-based remote branch by the branch network design template; and
based on determining that one or more devices associated with the intent-based remote branch have established connectivity with the SDN, sending, by the one or more controllers, the branch network design template and the plurality of software packages to the one or more devices associated with the intent-based remote branch, the branch network design template and the plurality of software packages causing the one or more devices to deploy the plurality of services at the intent-based remote branch, configure a network connectivity of the plurality of services, and implement a network topology defined by the branch network design template.

12. The system of claim 11, the operations further comprising receiving one or more configurations defined for the intent-based remote branch, the one or more configurations specifying at least one of the network topology of the intent-based remote branch, the plurality of services to be provisioned at the intent-based remote branch, one or more resources to be provisioned at the intent-based remote branch, and one or more service chains to be provisioned at the intent-based remote branch, wherein sending the branch network design template and the plurality of software packages includes sending the one or more configurations defined for the intent-based remote branch, wherein the branch network design template, the plurality of software packages, and the one or more configurations cause the one or more devices to provision the plurality of services.

13. The system of claim 12, wherein one or more networking settings in the branch network design template define the network connectivity of the plurality of services, and wherein the plurality of software packages includes software for deploying the plurality of services at the intent-based remote branch according to the one or more configurations and the one or more networking settings.

14. The system of claim 11, the operations further comprising:
determining that the one or more devices are associated with the branch network design template; and
based on the one or more devices being associated with the branch network design template, sending, to the one or more devices, the plurality of software packages, the branch network design template, and one or more configurations specified for the intent-based remote branch.

15. The system of claim 11, the operations further comprising:
monitoring the plurality of services provisioned at the intent-based remote branch;
determining that a service of the plurality of services has lost connectivity to the SDN; and
based on determining that the service has lost connectivity to the SDN, generating one or more instructions to restart the service at the intent-based remote branch.

16. A non-transitory computer-readable medium having stored therein instructions which, when executed by one or more processors, cause the one or more processors to perform operations comprising:
obtaining, by one or more controllers in a software-defined network (SDN), a branch network design template for deploying an intent-based remote branch in the SDN, wherein the branch network design template is based on an intent associated with the intent-based remote branch and defines networking settings for a plurality of services to be provisioned at the intent-based remote branch;
obtaining, by the one or more controllers, a plurality of software packages for the plurality of services to be provisioned at the intent-based remote branch, wherein one or more of the plurality of software packages are determined based on the branch network design template;
determining, by the one or more controllers, that one or more devices associated with the intent-based remote branch have established connectivity with the SDN, wherein the one or more devices are indicated for inclusion in the intent-based remote branch by the branch network design template; and
based on determining that one or more devices associated with the intent-based remote branch have established connectivity with the SDN, sending, by the one or more controllers, the branch network design template and the plurality of software packages to the one or more devices associated with the intent-based remote branch, the branch network design template and the plurality of software packages causing the one or more devices to deploy the plurality of services at the intent-based remote branch, configure a network connectivity of the plurality of services, implement a network topology defined by the branch network design template, and configure a transport network that interconnects the intent-based remote branch with the SDN, the transport network being configured based on one or more settings in the branch network design template.

17. The non-transitory computer-readable medium of claim 16, the operations further comprising receiving one or more configurations defined for the intent-based remote branch, the one or more configurations specifying at least one of the network topology of the intent-based remote branch, the plurality of services to be provisioned at the intent-based remote branch, one or more resources to be provisioned at the intent-based remote branch, and one or more service chains to be provisioned at the intent-based remote branch, wherein sending the branch network design template and the plurality of software packages includes sending the one or more configurations defined for the intent-based remote branch, wherein the branch network design template, the plurality of software packages, and the one or more configurations cause the one or more devices to provision the plurality of services.

18. The non-transitory computer-readable medium of claim 17, wherein the one or more networking settings associated with the branch network design template define the network connectivity of the plurality of services, and wherein the plurality of software packages includes software for deploying the plurality of services at the intent-based remote branch according to the one or more configurations and the one or more networking settings.

19. The non-transitory computer-readable medium of claim 16, the operations further comprising:
    determining that the one or more devices are associated with the branch network design template; and
    based on the one or more devices being associated with the branch network design template, sending, to the one or more devices, the plurality of software packages, the branch network design template, and one or more configurations specified for the intent-based remote branch.

20. The non-transitory computer-readable medium of claim 16, the operations further comprising:
    monitoring the plurality of services provisioned at the intent-based remote branch;
    determining that a service of the plurality of services has lost connectivity to the SDN; and
    based on determining that the service has lost connectivity to the SDN, generating one or more instructions to restart the service at the intent-based remote branch.

\* \* \* \* \*